United States Patent
Dodson et al.

(10) Patent No.: US 12,130,080 B2
(45) Date of Patent: Oct. 29, 2024

(54) METHODS OF SEPARATING CARBON DIOXIDE FROM FLUE GAS AND SEQUESTERING LIQUID CARBON DIOXIDE

(71) Applicant: Carbon Vault Technologies LLC, Denver, CO (US)

(72) Inventors: James B. Dodson, Castle Rock, CO (US); Richard F. McClure, Golden, CO (US)

(73) Assignee: Carbon Vault Technologies LLC, Denver, CO (US)

( * ) Notice: Subject to any disclaimer, the term of this patent is extended or adjusted under 35 U.S.C. 154(b) by 378 days.

(21) Appl. No.: 17/177,763

(22) Filed: Feb. 17, 2021

(65) Prior Publication Data

US 2021/0381758 A1 Dec. 9, 2021

Related U.S. Application Data (60) Provisional application No. 63/036,264, filed on Jun. 8, 2020.

(51) Int. Cl.
*F25J 1/00* (2006.01)
*B01D 53/00* (2006.01)

(52) U.S. Cl.
CPC .......... *F25J 1/0027* (2013.01); *B01D 53/002* (2013.01)

(58) Field of Classification Search
CPC ................. F25J 1/0027; B01D 53/002; B01D 2252/1035; B01D 2256/22;

(Continued)

(56) References Cited

U.S. PATENT DOCUMENTS 3,001,373 A * 9/1961 Eastman .............. F25J 3/04545
62/928
4,239,510 A * 12/1980 Hays .................. B01D 53/1475
166/267

(Continued)

FOREIGN PATENT DOCUMENTS

WO 95/11734 A1 5/1995
WO WO-2018069504 A1 * 4/2018 ............. B01D 53/62

OTHER PUBLICATIONS

Hart et al., "Cryogenic $CO_2$ Capture in Natural Gas," *Energy Procedia* 1 (2009) 697-706; doi: 10.1016/j.egypro.2009.01.092.

(Continued)

*Primary Examiner* — Miguel A Diaz
*Assistant Examiner* — Ibrahim A. Michael Adeniji
(74) *Attorney, Agent, or Firm* — David D. Hsu; Polsinelli LLP (57) ABSTRACT

Systems and methods to separate carbon dioxide from flue gases and sequester carbon dioxide are described here. By using the properties of carbon dioxide and the temperature in a body of water (e.g., the ocean or freshwater body of water) or the temperatures of the ambient atmosphere, gaseous carbon dioxide can be converted to a liquid and separated from other gases. Pressure used to separate carbon dioxide from other gases may also be used to sequester liquid carbon dioxide. The liquid carbon dioxide is inert and can be discharged into the ocean without dissolving in seawater and acidifying the ocean. The liquid carbon dioxide may further be densified to be denser than seawater. The liquid carbon dioxide can then sink to the bottom of the ocean or be injected into ocean sediments or sediments and rocks beneath the ocean floor, inert and sequestered for the long term.

23 Claims, 4 Drawing Sheets

(58) Field of Classification Search
CPC ...... B01D 2257/102; B01D 2258/0283; B01D 2258/06; B01D 53/1475; B01D 53/62; Y02C 20/40; E21B 43/36; F17C 2270/0128; F17C 1/007; F17C 2227/0318; F17C 2223/036; F17C 11/007; F17C 2221/013; F17C 2221/036; F17C 2270/0142
USPC .......... 62/53.1; 405/210; 95/226; 210/747.5; 166/357
See application file for complete search history.

(56) References Cited

U.S. PATENT DOCUMENTS

| | | | | |
|---|---|---|---|---|
| 5,397,553 | A * | 3/1995 | Spencer | B09B 1/002 48/190 |
| 5,405,595 | A * | 4/1995 | Tomikawa | F25J 1/0027 423/220 |
| 2008/0101999 | A1 * | 5/2008 | Balczewski | C10L 3/108 422/228 |
| 2010/0284749 | A1 * | 11/2010 | Capron | B01D 53/84 435/41 |
| 2010/0326924 | A1 * | 12/2010 | Georgiou | E21B 41/0064 210/768 |
| 2011/0056373 | A1 * | 3/2011 | Baxter | B01D 53/62 95/213 |
| 2011/0167798 | A1 * | 7/2011 | Evans-Beauchamp | B01D 53/002 60/274 |
| 2012/0244053 | A1 * | 9/2012 | Self | B01D 53/62 423/220 |
| 2014/0079594 | A1 * | 3/2014 | Caldeira | F17C 1/007 422/232 |
| 2014/0261132 | A1 * | 9/2014 | Zeren | F17C 9/04 417/151 |
| 2016/0107893 | A1 * | 4/2016 | D'Souza | C01B 32/40 423/220 |
| 2016/0319991 | A1 * | 11/2016 | Caldeira | F17C 1/16 |
| 2018/0178161 | A1 * | 6/2018 | Mettler | B01D 53/62 |
| 2018/0229178 | A1 * | 8/2018 | Mettler | F17C 1/007 |

OTHER PUBLICATIONS

Leung et al., "An overview of current status of carbon dioxide capture and storage technologies," *Renewable and Sustainable Energy Reviews* 39 (2014) 426-443; http://dx.doi.org/10.1016/j.rser.2014.07.093.

Songolzadeh et al., "Carbon Dioxide Separation from Flue Gases: a Technological Review Emphasizing Reduction in Greenhouse Gas Emissions," *The Scientific World Journal* vol. 2014, Article ID 828131, 34 pages.

Voormeij et al., "Geological and Mineral CO2 Sequestration Options: a Technical Review," *Geological Fieldwork 2002, Paper* 2003-I.

Xu et al., "A novel $CO_2$ cryogenic liquefaction and separation system," *Energy* 42 (2012) 522-529; doi: 10.1016/j.energy.2012.02.048.

Caldeira Ken et al., "Ocean Storage" In: "Chapter 6: Carbon Dioxide Capture and Storage", Jan. 1, 2005, Cambridge University Press, XP055831398, pp. 278-318, Retrieved from the Internet: URL: https://www.ipcc.ch/report/carbon-dioxide-capture-and-storage/> see, in particular figures 6.1 and box 6.2 with figures 6.8 to 6.10 therein.

Hamid Sarv, "Large-scale CO2 Transportation and Deep Ocean Sequestration DE-AC26-98FT40412 Phase I Final Report", Mar. 31, 1999, p. i-25, XP055652105, Retrieved from the Internet: URL:https://www.osti.gov/servlets/purl/833297 [retrieved on Dec. 11, 2019] see, in particular, last paragraph at p. 3 of 25; Figures 1 (a) and (b) at p. 4 of 25; see entire point "2.1 Properties of Liquid CO2" at p. 5 of 25 and p. 5 of 25 last paragraph.

Herzog Howard et al., "Carbon Capture and Storage from Fossil Fuel Use" In: "Encyclopedia of Energy", Jan. 1, 2004, Elsevier, XP055831156, ISBN: 978-0-12-176480-7 pp. 277-287, DOI: 10.1016/B0-12-176480-X/00422-8, Retrieved from the Internet: URL: https://sequestration.mit.edu/pdf/encyclopedia_of_energy_article.pdf see, in particular, figure 1 and point E. "Utilisation".

Herzog H. J. et al., "Carbon Dioxide Recovery and Disposal from Large Energy Systems", *Annual Review of Energy and the Environment*, vol. 21, No. 1, Nov. 1, 1996, pp. 145-166, XP55831047, ISSN: 1056-3466, DOI: 10.1146/annurev.energy.21.1.145 see in, particular, lines 1 to 12 of the point "Ocean Disposal" at p. 153 as well as the entire point "Dissolution" at pp. 155-156; entire point "Dispersion" at pp. 156 and 157 and entire point "Isolation" at pp. 157-158.

International Search Report and Written Opinion for PCT/US2021/033228 mailed Aug. 20, 2021, all pages.

Renforth Phil et al., "Assessing ocean alkalinity for carbon sequestration: Ocean Alkalinity for C Sequestration," *Reviews of Geophysics*, vol. 55, No. 3, Jul. 27, 2017, pp. 636-674, XP055830798, ISSN: 8755-1209, DOI: 10.1002/2016RG000533 Retrieved from the Internet: URL: https://api.wiley.com/onlinelibrary/tdm/v1/articles/10.1002%2F2016RG000533> see, in particular, point 2.1 "The saturation state of carbonate minerals in the ocean" as well as point 6. "Ocean transport and disposal".

Teng Yihua et al, "Long-term viability of carbon sequestration in deep-sea sediments," Science Advances, vol. 4, No. 7, Jul. 1, 2018, p. eaao6588, XP55831409, DOI: 10.1126/sciadv.aao6588 see, in particular, figure 1.

* cited by examiner

METHODS OF SEPARATING CARBON DIOXIDE FROM FLUE GAS AND SEQUESTERING LIQUID CARBON DIOXIDE

CROSS-REFERENCE TO RELATED APPLICATION

This application claims priority benefit of U.S. Provisional Patent Application No. 63/036,264, filed Jun. 8, 2020, all of which are incorporated herein by reference in their entirety.

BACKGROUND

Carbon dioxide is a known greenhouse gas. Industrial processes that combust hydrocarbons produce carbon dioxide as a byproduct. One way to mitigate the effects of carbon dioxide production on climate change is carbon dioxide sequestration. Carbon dioxide sequestration involves removing carbon dioxide from the atmosphere or capturing carbon dioxide prior to release from industrial processes and depositing carbon dioxide into a reservoir so that the carbon dioxide cannot re-enter or enter the atmosphere. Separation of the carbon dioxide from other flue gases from industrial processes is difficult. Geologic sequestration of carbon dioxide in the earth is also challenging. Thus, improvements to separating carbon dioxide from flue gases and sequestering carbon dioxide are desired. These and other needs are addressed.

BRIEF SUMMARY

Embodiments of the present invention allow for the separation and sequestration of carbon dioxide efficiently. By using the properties of carbon dioxide and the temperatures in a body of water (e.g., the ocean or a freshwater body of water) or the temperatures of the ambient atmosphere, gaseous carbon dioxide can be converted to a liquid and separated from other gases. Pressure used to separate carbon dioxide from other gases may also be used to sequester liquid carbon dioxide. The liquid carbon dioxide is inert and can be discharged into the ocean at depths having sufficient pressures without dissolving in seawater and acidifying the ocean. The liquid carbon dioxide may further be densified to be denser than seawater. The liquid carbon dioxide can then sink to the bottom of the ocean, or be injected into ocean floor sediments or rocks, inert and sequestered for the long term.

Embodiments may include a method of utilizing ocean depths to separate carbon dioxide from other gases. The method may include flowing a first mixture of gases to a depth in an ocean. The first mixture may include carbon dioxide and other gases. The method may also include liquefying the carbon dioxide as a result of the depth and/or the temperature in the ocean to form liquid carbon dioxide. The first mixture of gases may flow in a pipe in an ocean. The carbon dioxide may liquefy as a result of the pressure within the pipe and the temperature effect of the ocean on the pipe at the depth. The liquid carbon dioxide may not mix with seawater within the pipe. The liquid carbon dioxide is not carbon dioxide dissolved in water. The method may further include separating the liquid carbon dioxide from the other gases. Furthermore, the method may include flowing a second mixture of the other gases upward to the ocean surface.

Embodiments may include a system for separating carbon dioxide from other gases. The system may include a first pipe configured to deliver a first gas mixture from a surface of a body of water to a first depth in a body of water. The first depth may be at least 10 feet subsurface. The system may also include a second pipe configured to deliver a second gas mixture from the first depth in the body of water to the surface of the body of water. The second pipe may be in fluid communication with the first pipe. The system may also include a separation chamber in fluid communication with the first pipe and the second pipe. The system may include a port connected to the separation chamber. The port may be configured to discharge liquefied carbon dioxide separated from the first gas mixture out of the separation chamber. Furthermore, the system may include a compressor configured to inject the first gas mixture from the surface of the body of water to the first depth in the ocean through the first pipe.

Embodiments may include a method of separating carbon dioxide from a gas mixture. The method may include flowing a first mixture of gases through a structure, the first mixture comprising carbon dioxide and other gases. The method may also include liquefying the carbon dioxide at a location in the structure to form liquid carbon dioxide as a result of the ambient temperature outside the structure at the location and the pressure of the mixture in the structure at the location. The liquid carbon dioxide is not carbon dioxide dissolved in water. The method may further include separating the liquid carbon dioxide from the other gases to form separated liquid carbon dioxide. In addition, the method may include sequestering the separated liquid carbon dioxide.

A better understanding of the nature and advantages of embodiments of the present invention may be gained with reference to the following detailed description and the accompanying drawings.

DETAILED DESCRIPTION

Carbon dioxide, a greenhouse gas, is a byproduct of industrial processes, including refineries, fossil fuel power plants, chemical plants, and any other processes with hydrocarbon combustion. Sequestering the carbon dioxide is challenging. Carbon dioxide is generated with other flue gases and should be separated from the other flue gases before sequestration. Flue gases may include carbon dioxide, nitrogen, oxygen, and water vapor. Nitrogen may make up about 40 to 80% of the flue gas. Carbon dioxide may be about 3 to 50% of the flue gas. Water vapor may be removed from flue gas. Nitrogen oxides ($NO_x$), sulfur oxides ($SO_x$), carbon monoxide, and particulate matter may make up a small percentage of flue gas. Separation of carbon dioxide from other flue gases can be an expensive process.

Conventional sequestration of carbon dioxide can also be challenging. Storing carbon dioxide as a compressed gas or a liquid is preferred over storing carbon dioxide as an uncompressed gas because of the smaller volume occupied by the compressed gas or liquid. One method of sequestering carbon dioxide involves injecting carbon dioxide deep into a well in the earth. The pressure within an injection well increases with depth, which would favor the liquid phase of carbon dioxide or a compressed gas. However, the temperature of the rocks surrounding the injection well also increases with depth. For example, the temperature may increase about 1.7° F. for every 100 feet of depth. Hence, sequestering at 6,000 feet below the surface results in an increase of about 100° F.

The ocean provides an environment where the temperature does not increase, but rather decreases or remains stable in the 33 to 63° F. range, with increased depth. Additionally, the decrease in temperature is accompanied by an increase in pressure, which is not normally expected. Within a pipe in the ocean, pressure can be built up with depth in the pipe while taking advantage of the natural and ambient cooling available from ocean water surrounding the pipe. As a result, injecting carbon dioxide into the ocean within a pipe is advantageous. As used herein, "ocean" is not limited to only geographically named oceans (e.g., Atlantic Ocean, Pacific Ocean). Ocean includes any part of the body of salt water that covers nearly seventy-five percent of the earth. Environments other than the ocean, including freshwater bodies of water or air at ambient temperatures, may be used to cool the pipe while liquefying carbon dioxide.

Figure 3:
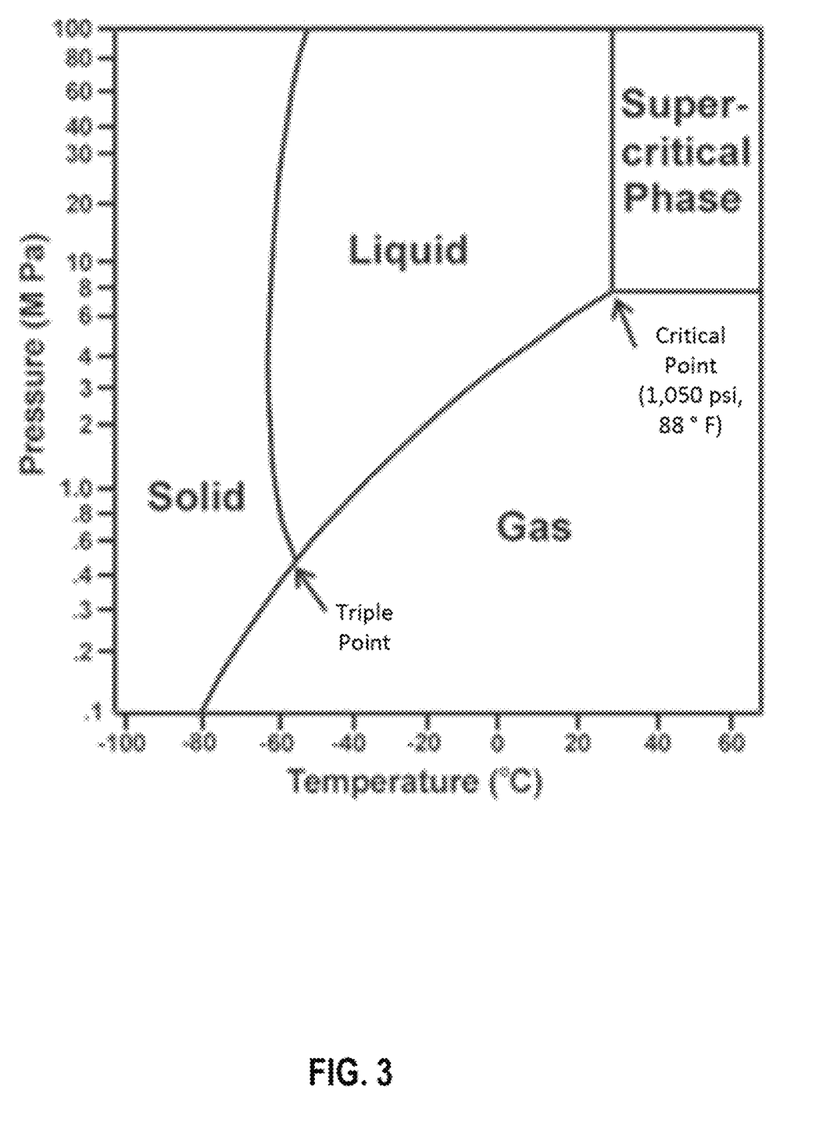
FIG. 3 shows a carbon dioxide phase diagram from D. A. Voormeij et al., "Geological and Mineral $CO_2$ Sequestration Options: A Technical Review," *Geological Fieldwork* 2002, *Paper* 2003-1.

Furthermore, the unique physical characteristics of carbon dioxide make injecting carbon dioxide even more beneficial. FIG. 3 shows a phase diagram of carbon dioxide. Pressure is shown in MPa on the y-axis, and temperature is shown in degrees Celsius on the x-axis. Pressures can be converted to psi, and temperatures can be converted to degrees Fahrenheit and vice versa. The phase diagram of carbon dioxide indicates that at the pressures and temperatures available at ocean depths, carbon dioxide is a liquid. For example, the critical point of carbon dioxide is at about 1,050 psi and 88° F. (7.38 MPa and 31.1° C.). At temperatures below 88° F. and pressures above 1,050 psi, carbon dioxide is a liquid. At these pressures and temperatures, typical flue gases remain in the gas phase.

Temperatures below 88° F. and pressures above 1,050 psi can be achieved at ocean depths, including at ocean depths within a pipe, separated from the seawater. As a result of the properties of carbon dioxide and flue gases, the carbon dioxide becomes a liquid while the remainder of the flue gases remain gases. The separation of a liquid from a gas is simpler than the separation of a gas from other gases. The carbon dioxide may condense and essentially rain out of the gas mixture. The liquid carbon dioxide may move to the bottom of a container because of its higher density and can be removed from the flue gases. The separation of liquid carbon dioxide from the other gases may be a continuous process in the pipe. Pressure for liquefying carbon dioxide may also drive sequestration of separated carbon dioxide. For example, liquid carbon dioxide may not have its pressure reduced (e.g., to atmospheric pressure) before liquid carbon dioxide is sent to be sequestered. Additional pressure may be added to the liquid carbon dioxide to aid sequestration.

The separated carbon dioxide may be returned to the surface and then used for other applications or geologically sequestered. The remaining flue gases, which would have already been treated to meet environmental standards to be vented to the atmosphere at the process plant, can be released to the atmosphere.

The pressure in the pipe may reach 1,050 psi through a combination of compression at or near the surface pressure and the weight of the fluid column. The pressure in the pipe may reach a pressure of 1,050 psi at 500 to 3,000 feet or deeper. The temperature of seawater at these depths is typically well under 88° F. Going to the deeper depths (e.g., around 3,000 feet or 914 meters) may result in a higher pressure and typically a lower temperature.

Liquid carbon dioxide also has another property that improves sequestration techniques in the ocean. Liquid carbon dioxide can increase its density under higher pressures. The density of liquid carbon dioxide can be increased to be higher than that of seawater at the same pressure. By bringing liquid carbon dioxide to a depth of about 9,000 feet (2,473 m), the pressure of about 4,000 psi will make liquid carbon dioxide denser than seawater. The increase in pressure from about 1,050 psi for liquid carbon dioxide and 88° F. to 4,000 psi may be provided by a pump or other suitable device. Releasing the liquid carbon dioxide into the ocean may then result in the liquid carbon dioxide sinking to the ocean floor. The carbon dioxide could be routed to a deep trench, which would provide a huge reservoir for sequestration or the carbon dioxide could be pumped into ocean sediments or ocean seafloor rocks for permanent sequestration. However, if liquid carbon dioxide is not at sufficiently high pressures and sufficiently low temperatures, the liquid carbon dioxide may be less dense than the surrounding seawater. As used herein, "seawater" includes any salt water in the ocean. The liquid carbon dioxide may then rise and eventually turn back to gaseous carbon dioxide, which may then dissolve in the seawater or be released to the atmosphere.

The movement of liquid carbon dioxide from the first depth where carbon dioxide liquefies to a second depth where liquid carbon dioxide is denser than seawater may be accomplished by pumps rather than with a compressor, as typical for moving gaseous carbon dioxide. Pumping a liquid is generally easier and cheaper than compressing a gas. Additionally, a column of liquid carbon dioxide applies additional pressure to liquid carbon dioxide below the column. The pressure from the column also reduces the amount of pressure that needs to be applied by a pump to achieve a sequestration pressure at which liquid carbon dioxide is denser than seawater.

In some embodiments, the pressure needed for a phase change of gaseous carbon dioxide to liquid carbon dioxide may be provided by the seawater itself. For example, in some embodiments, the seawater may be separated from the gas mixture by a movable partition (e.g., a piston), which transfers the seawater pressure to the gas without direct contact between the seawater and the gas. In preferred embodiments, the pressure applied to the gas mixture is from compression of the gas at or near the ocean surface and not from pressure from the seawater.

Liquefying gases, such as carbon dioxide, in a mixture of gases is often seen as a problem to be avoided with transporting gases in pipelines (e.g., A. Hart et al., "Cryogenic $CO_2$ capture in natural gas," *Energy Procedia* 1 (2009)). Liquefying only some gases in a gas mixture may result in difficulty moving gases together with a liquid. This problem to be avoided with conventional processes is instead a solution for separating and sequestering carbon dioxide. In embodiments of the present invention, carbon dioxide is liquefied during transport of gases.

Figure 1:
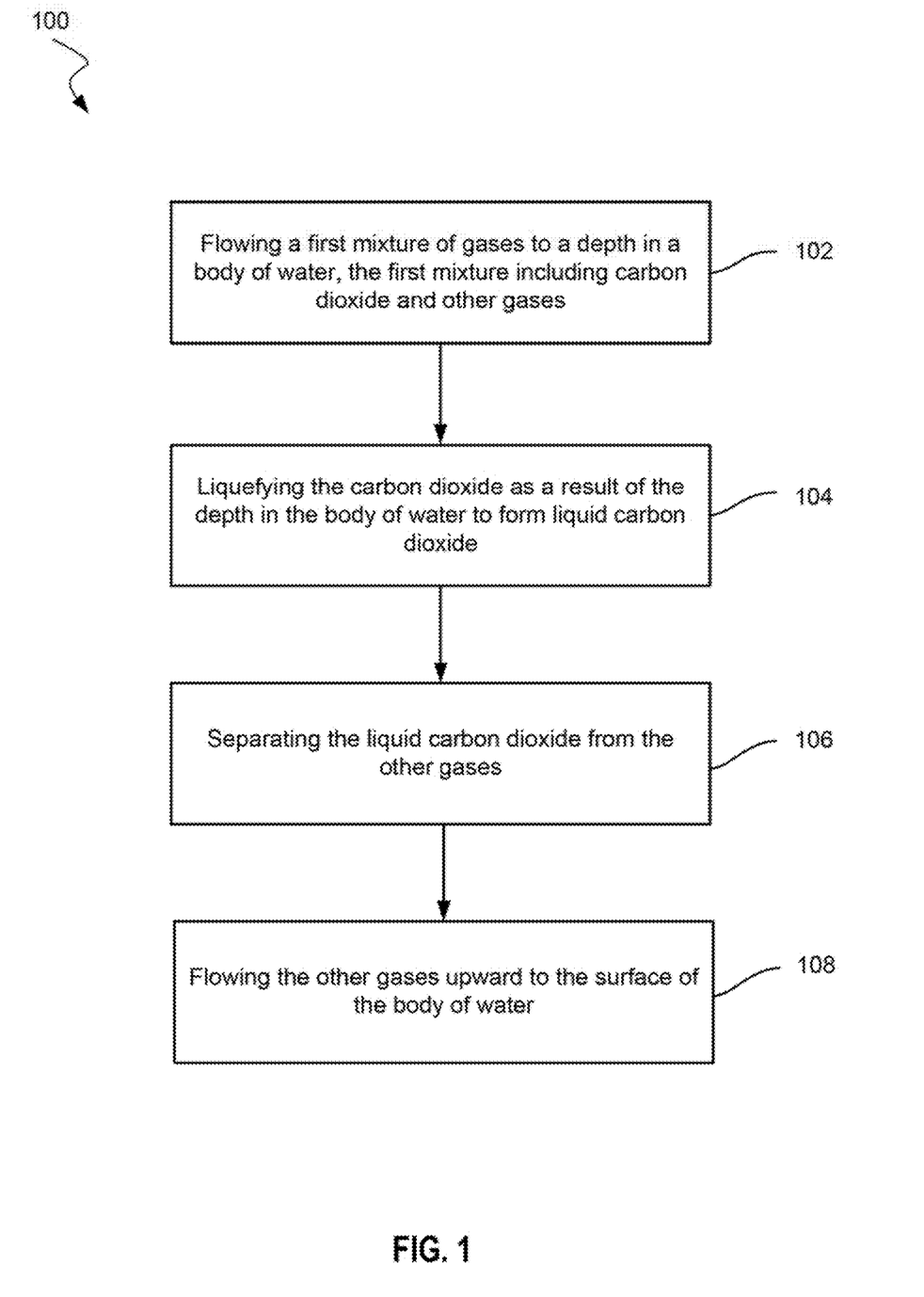
FIG. 1 shows a method of utilizing ocean depths to separate carbon dioxide from flue gases according to embodiments of the present invention.

FIG. 1 shows a method 100 of utilizing ocean depths to separate carbon dioxide from other flue gases. Method 100 may be an example of any method described herein and may be used with any system described herein. At block 102, the method involves flowing a first mixture of gases to a first depth in an ocean. The first mixture of gases may be flowed within a pipe. The flow may be turbulent (e.g., Reynolds number over 2,900) or laminar (e.g., Reynolds number less than 2,000). The flow rate of the first mixture of gases may be from 50 to 100 mmcfd (million cubic feet per day), 100 to 200 mmcfd, 200 to 500 mmcft, 500 to 1,000 mmcft, or more. The first mixture may include carbon dioxide and other gases. The other gases may include flue gases, not including carbon dioxide. The other gases may include products from combusting hydrocarbon fuel, molecular nitrogen, or molecular oxygen. The other gases may or may not include water. Water may be removed prior to flowing the first mixture of gases to the first depth in the ocean. The carbon dioxide may be 3% or more by mass of the first mixture of gases. For example, the carbon dioxide may be 3% to 5%, 5% to 10%, 10% to 20%, or more than 20% by mass of the first mixture of gases. The first depth may be the depth at which the pressure within the pipe and the temperature of the pipe provided by the seawater are sufficient to convert carbon dioxide from a gas to a liquid. For example, the first depth may have a temperature and a pressure that is in the liquid phase of the carbon dioxide phase diagram in FIG. 3. The first mixture may be flowed to the first depth by a compressor.

At block 104, the method may include liquefying the carbon dioxide as a result of the first depth in the ocean to form liquid carbon dioxide. The carbon dioxide may be liquefied in a pipe. The first depth in the ocean may be a first depth within a pipe. The carbon dioxide is not carbon dioxide dissolved in seawater. The first depth may be at least 10 feet. For example, the first depth may be 10 to 50 feet, 50 to 500 feet, 500 to 1,000 feet, 1,000 to 1,500 feet, 1,500 to 2,000 feet, 2,000 to 2,500 feet, 2,500 to 3,000 feet, 3,000 to 3,500 feet, 3,500 to 4,000 feet, 4,000 to 4,500 feet, 4,500 to 5,000 feet, or more than 5,000 feet.

The carbon dioxide may liquefy as a result of the pressure and temperature at the depth. The pressure may be a result of compression of the gas in a pipe. The pressure may be at least 500 psi. As examples, the pressure may be 500 to 1,000 psi, 1,000 to 1,300 psi, 1,300 to 1,400 psi, 1,400 to 1,500 psi, or greater than 1,500 psi. In preferred embodiments, the pressure may be caused by compression at or near the ocean surface and the weight of the fluid column above the depth. In some embodiments, the pressure may be caused by the seawater itself. The pressure may be caused by a column of seawater on top of the gases (e.g., as a piston). The temperature may be less than 88° F. For example, the temperature may be 85 to 88° F., 80 to 85° F., 70 to 80° F., 60 to 70° F., 50 to 60° F., 40 to 50° F., 32 to 40° F., or 20 to 32° F. In some embodiments, the pressure may be 600 to 650 psi. The temperature may be the result of the temperature of the seawater at the depth. No other cooling or refrigeration may be used except for heat transfer from the seawater, which cools at lower depths. In some embodiments, cooling may be included as part of a compression system. The temperature of the compressed gas mixture to the temperature before compression. Such cooling may use a radiator to decrease the temperature from around 125° F. after compression.

The liquefying of carbon dioxide may be in a vertical or substantially vertical section of a pipe. The section of the pipe for liquefying may not be horizontal (e.g. 0°). The angle of the section of pipe may be from 10° to 30°, from 30° to 45°, from 45° to 60°, from 60° to 80°, from 80° to 85°, or from 85° to 90°. In this manner, the liquid carbon dioxide may travel in the same direction as the other gases in the gas mixture by gravity and therefore transport of gases would not be negatively impacted by having liquid in the pipe.

At block 106, the method may include separating the liquid carbon dioxide from the other gases. Separating the liquid carbon dioxide may be through carbon dioxide condensing to become a liquid while the other gases remain gaseous. The liquid may move to the bottom of a chamber while the other gases move to the top of the chamber. The chamber may be called a separation chamber or a $CO_2$ recovery chamber. Separating the liquid carbon dioxide from the other gases may not involve absorbents, adsorbents, or a membrane. The separation of the liquid carbon dioxide may be the result of the carbon dioxide becoming a liquid resulting from the temperature and pressure and not from any other unit operations or other techniques for liquefying the carbon dioxide.

At block 108, the method may include flowing a second mixture of the other gases upward to the ocean surface. Flowing the second mixture of the other gases upward to the ocean surface may be the result of the other gases being less dense than the liquid carbon dioxide and buoyant. The method may include releasing the second mixture into the atmosphere. The flue gases in the second mixture may have already been at concentrations acceptable by environmental regulations, including regulations set by the U.S. Environmental Protection Agency and/or other regulatory agencies. In some embodiments, the second mixture may be flowed upward using a compressor.

The method may include flowing carbon dioxide separated from the other gases to the ocean surface. The carbon dioxide may start as a liquid and then turn into a gas as the carbon dioxide approaches the surface. In some embodiments, the separated carbon dioxide may be flowed to land. The carbon dioxide may be geologically sequestered. In some embodiments, the carbon dioxide may be used in an industrial process, such as making carbonate bricks, cement, fuel, or other products.

The method may include flowing the liquid carbon dioxide to a second depth. The second depth may be deeper than the first depth. The second depth may be at least 7,000 feet. For example, the second depth may be 7,000 to 8,000 feet, 8,000 to 9,000 feet, 9,000 to 10,000 feet, 10,000 to 11,000 feet, 11,000 to 12,000 feet, or greater than 12,000 feet. A pump may be used to flow the liquid carbon dioxide from the first depth to the second depth, as the liquid is separate from the gases. The pressure at the second depth may be at least 3,000 psi, including 3,000 to 3,500 psi, 3,500 to 4,000 psi, 4,000 to 4,500 psi, 4,500 to 5,000 psi, or greater than 5,000 psi. The difference in pressure at the first depth and the second depth may be added through a pump or other suitable device. The pressure may monotonically increase from the first depth to the second depth. The pressure used for liquefying carbon dioxide therefore may contribute to the pressure used for sequestering liquid carbon dioxide.

At the second depth, the density of liquid carbon dioxide may be higher than the density of the seawater at or near the same depth. The second depth may make the liquid carbon dioxide denser than seawater for the temperature, salinity, and density of seawater at the particular location in the ocean. The method may include contacting the liquid carbon dioxide with water in the ocean without dissolving the liquid carbon dioxide in water. The liquid carbon dioxide may form hydrates after contacting the sea water, and the carbon dioxide may not be released from the hydrate to dissolve into the water. The method may include releasing liquid carbon dioxide to the seawater. The liquid carbon dioxide may flow to the bottom of the ocean as a result of the density of the liquid carbon dioxide being higher than the density of the seawater. The carbon dioxide may then be sequestered, as it is stable at the bottom of the ocean. The bottom of the ocean may include at the bottom of a trench in the ocean.

In some embodiments, the liquid carbon dioxide may be released directly into sediments, rocks, or other geologic formations making up the ocean floor or existing beneath the ocean floor. Deep sea sediments may have thicknesses of 1 to 4,000 feet. Liquid carbon dioxide may be released into any depth within the sediment. Liquid carbon dioxide may be pumped into shallow ocean sediments where the carbon dioxide forms hydrates or may be held in place by gravity, density differences with seawater, and/or pore space pressure.

The carbon dioxide may be discharged into seawater at a rate from 100,000 metric tons to 100 million metric tons per year or more. The flue gas may be discharged into the atmosphere at a rate from 100,000 metric tons to 500 million metric tons per year or more.

In some embodiments, the liquid carbon dioxide may be injected into basalt, which may exist at or beneath the ocean floor. The liquid carbon dioxide may react with basalt to form calcium and/or magnesium carbonate minerals. The carbon dioxide may be incorporated into a mineral matrix. As a result, the carbon dioxide may be sequestered in mineral form instead of in liquid form or gaseous form.

Figure 2:
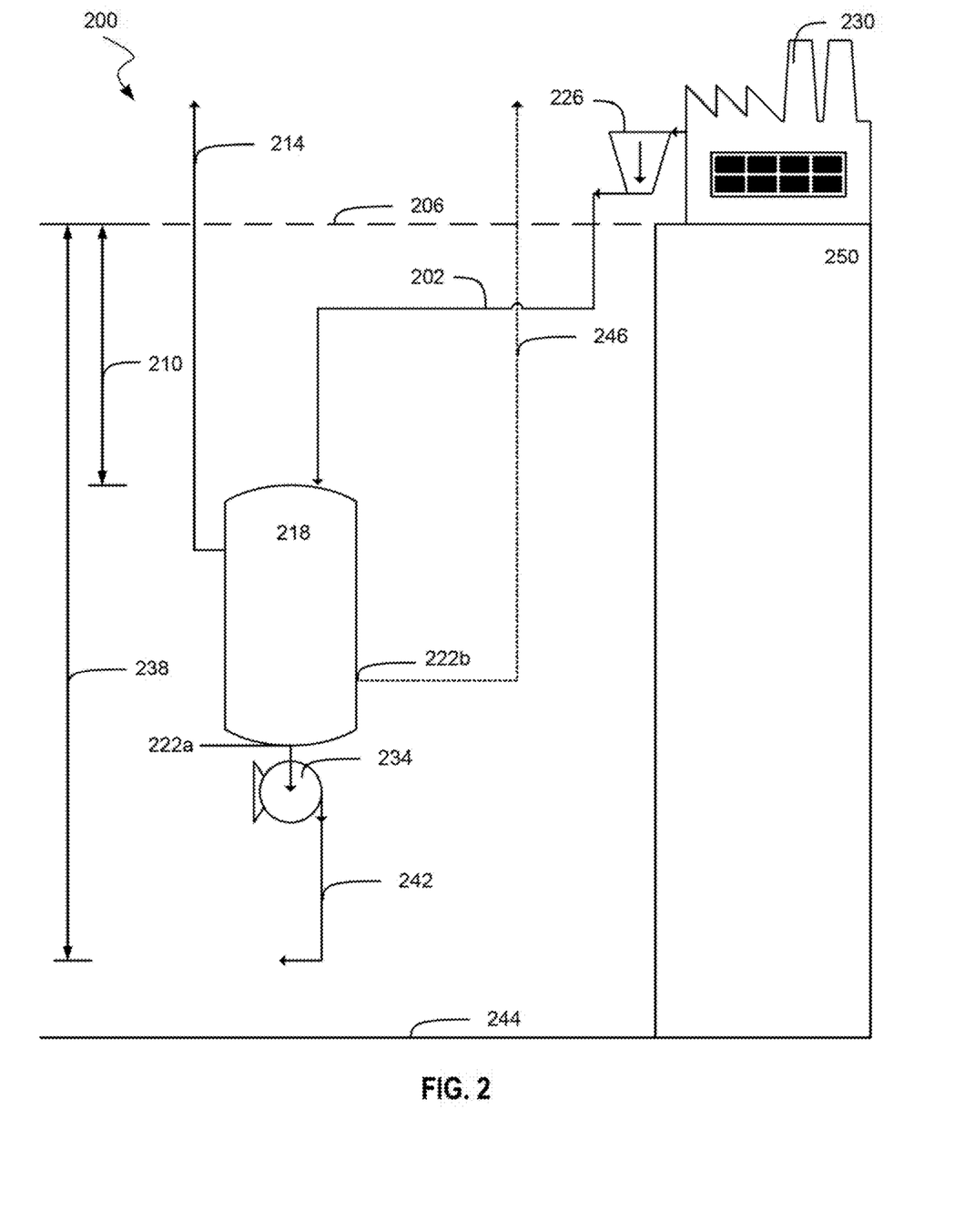
FIG. 2 shows a system for separating carbon dioxide from flue gases according to embodiments of the present invention.

FIG. 2 shows a system 200 for separating carbon dioxide from flue gases. System 200 may resemble an oil platform when viewed at the ocean surface. System 200 may be used with any method described herein. The system may include a first pipe 202 configured to deliver a first gas from a surface 206 of a body of water to a first depth 210 in a body of water. The body of water may be the ocean or a freshwater body of water. For example, the freshwater body of water may be a lake or a reservoir. First depth 210 may be at least 2,400 feet. As examples, first depth 210 may be 0.5 to 1 foot, 1 to 25 feet, 25 to 50 feet, 50 to 150 feet, 150 to 200 feet, 200 to 500 feet, 500 to 1,000 feet, 1,000 to 1,500 feet, 1,500 to 2,000 feet, 2,000 to 2,500 feet, 2,500 to 3,000 feet, 3,000 to 3,500 feet, 3,500 to 4,000 feet, 4,000 to 4,500 feet, 4,500 to 5,000 feet, or more than 5,000 feet. The first depth may be deep enough to provide cooling to the first pipe for liquefying carbon dioxide. First pipe 202 and any other pipe disclosed herein may be stainless steel or any suitable material. First pipe 202 may be vertical at the location where carbon dioxide begins to liquefy.

The pipe may have a burst strength rated for any pressure described herein. In some embodiments, the pipe may have a burst strength rated for the pressure difference between the pressure in the pipe and the pressure outside of the pipe. The pipes may have the advantage of not needing to be built to withstand the full force of the depths of the body of water because the pressure inside the pipe partly counteracts the force from the body of water outside the pipe. In some embodiments, the pipe may have a burst strength rating of at least 1,000 psi, including 1,440 psi. The pipe may have a diameter of 0.5 to 1 inch, 1 to 5 inches, 5 to 8 inches, 8 to 10 inches, 10 to 12 inches, 12 to 15 inches, 15 to 20 inches, or greater than 20 inches.

System 200 may include a second pipe 214. Second pipe 214 may be configured to deliver a second gas mixture from first depth 210 in the body of water to the surface of the body of water 206. Second pipe 214 may be in fluid communication with first pipe 202. Second pipe 214 may be the same or different size and/or material as first pipe 202.

System 200 may include a separation chamber 218. Separation chamber 218 may be in fluid communication with first pipe 202 and second pipe 214. In some embodiments, separation chamber 218 may be configured to transfer pressure from the body of water at first depth 210 to the first gas mixture. For example, in some embodiments, separation chamber 218 may allow seawater to enter. First pipe 202 may allow seawater to enter and pressure caused by the column of seawater may cause carbon dioxide to condense. Seawater may be pumped into first pipe 202. In some embodiments, separation chamber 218 may be a section of a pipe where carbon dioxide condenses.

Separation chamber 218 may include a "knockout" device similar to those used in oilfields. A knockout, viewed horizontally, would include one or more bends in the pipe. For example, a pipe may wind up and down. The knockout may drain fluid from the low spots in the bends and gases may be removed from the tops of the bends. A knockout device may include an increase in the diameter of a pipe in order to decrease the velocity of flow, which allows time for the liquids or heavier constituents to separate from the stream by gravity. A knockout device may include an expanded area. The knockout may be a location with a slightly larger piece of pipe. The slightly larger piece of pipe allows for expansion of gases and the separation of liquids out of a stream of gas.

In some embodiments, separation chamber 218 may include a flexible or movable component that allows the pressure of the seawater to transfer to the first gas mixture inside separation chamber 218. The flexible component may be a flexible material. The pressure of the seawater may press upon the flexible component, which then presses upon the first gas mixture with a pressure of 1,050 psi or more.

System 200 may include a port (222a or 222b). Port 222a or port 222b may be connected to separation chamber 218. Port 222a or 222b may be configured to discharge liquefied carbon dioxide separate from the first gas mixture out of separation chamber 218. Port 222a or port 222b may be at the bottom of separation chamber 218 so that the denser liquefied carbon dioxide can be separated from the first gas mixture.

System 200 may include a compressor 226. Compressor 226 may be configured to inject the first gas mixture from the surface of the body of water 206 to first depth 210 in the body of water through first pipe 202. Compressor 226 may be configured to provide a pressure of at least 1,050 psi to a first gas in first pipe 202 at first depth 210. Compressor 226 may be part of a process plant 230. Process plant 230 may be any plant generating carbon dioxide and flue gases. The compressor may not need to pressurize the first gas mixture to the full target pressure as the hydrostatic pressure of the column of gas above first depth 210 contributes to the pressure at the first depth.

System 200 may further include a pump 234. Pump 234 may be in fluid communication with port 222a. Pump 234 may be configured to flow the liquefied carbon dioxide to a second depth 238 of at least 7,000 feet. For example, the second depth may be 7,000 to 8,000 feet, 8,000 to 9,000 feet, 9,000 to 10,000 feet, 10,000 to 11,000 feet, 11,000 to 12,000 feet, or greater than 12,000 feet.

System 200 may further include a third pipe 242 in fluid communication with pump 234. Third pipe 242 may be configured to discharge liquefied carbon dioxide into seawater at second depth 238. Third pipe 242 may be positioned such that liquefied carbon dioxide would settle on the ocean floor 244. The liquefied carbon dioxide would be inert in the seawater. In some embodiments, third pipe 242 may not convey liquefied carbon dioxide under the surface of the ocean floor. In other embodiments, third pipe 242 may convey liquefied carbon dioxide into sediments on the floor of the ocean or into sediments or rocks beneath the ocean floor. Third pipe 242 may include a steel casing inserted into a drilled hole in ocean floor sediments or rocks. The steel casing may be cemented in place. The casing and the surrounding cement may be perforated to allow liquid carbon dioxide into sediments or rock.

System 200 may further include a fourth pipe 246. Fourth pipe 246 may be connected to port 222b. Fourth pipe 246 may be configured to deliver the carbon dioxide to the surface of the body of water 206. A pump may flow the liquefied carbon dioxide up fourth pipe 246. In some embodiments, liquefied carbon dioxide may turn back to gas with a decrease in pressure. The carbon dioxide gas then may travel up fourth pipe 246. Fourth pipe 246 may deliver the carbon dioxide to land 250. Carbon dioxide delivered to land may be geologically sequestered or used as a feedstock for other processes.

In some embodiments, no third pipe 242 may be included when fourth pipe 246 is included. In other embodiments, no fourth pipe 246 may be included when the third pipe 242 is included.

System 200 may exclude chillers or any heat transfer devices involving a refrigerant or other fluid that is not atmospheric air or water in the body of water. For example, system 200 may not include a non-naturally recirculated fluid that heats up in contact with a pipe and then cools down in another area.

Figure 4:
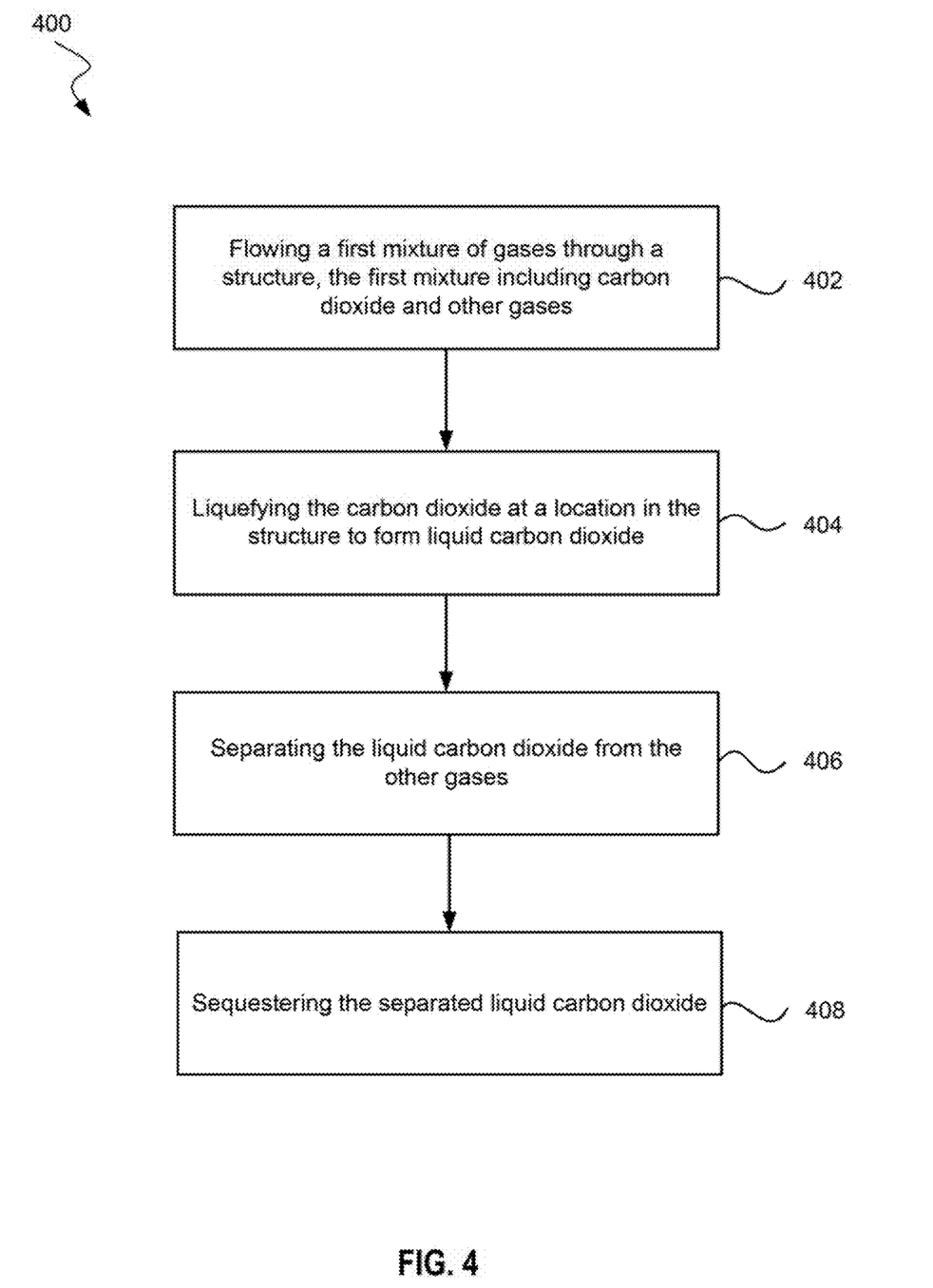
FIG. 4 shows a method of sequestering carbon dioxide from flue gases according to embodiments of the present invention.

FIG. 4 shows a method 400 of separating carbon dioxide from a gas mixture. Method 400 may not be restricted to using ocean depths to generate the pressures and/or temperatures for liquefying carbon dioxide. Method 400 may involve using a body of water within a single land mass. For example, the body of water may be a lake or a reservoir. Method 400 may also not involve a body of water to cool or pressurize the gas mixture. Method 400 may involve the gas mixture being air cooled to temperatures below 88° F. and pressurized by a compressor to requisite pressures for liquefying carbon dioxide. Method 400 may include using all or aspects of system 200.

At block 402, method 400 may include flowing a first mixture of gases through a structure. The first mixture may include carbon dioxide and other gases. The structure may include a pipe, including any pipe described herein. A portion of the pipe may be vertical. In some embodiments, the structure may include substructures to increase heat transfer from inside the structure to outside the structure. For example, the substructures may include fins.

At block 404, method 400 may include liquefying the carbon dioxide at a location in the structure to form liquid carbon dioxide as a result of the ambient temperature outside the structure at the location and the pressure of the mixture in the structure at the location. The liquid carbon dioxide may not be carbon dioxide dissolved in water.

In some embodiments, the structure at the location may be contacting atmospheric air. The ambient temperature may be below 88° F. or may be any temperature described herein. The atmospheric air may be 80 to 88° F., 60 to 80° F., 40 to 60° F., 32 to 40° F., 20 to 32° F., 0 to 20° F., or under 0° F. The temperature of the ambient air may depend on the local weather, season, and/or climate. In situations when the ambient temperature of the atmospheric air is above 88° F., the gas mixture may be diverted into a structure with alternative cooling technique (e.g., a body of water).

In some embodiments, the structure at the location may be contacting water in a body of water other than the ocean. The body of water may be a freshwater body of water, including a lake or a reservoir. The ambient temperature of the water contacting the structure may be below 88° F. or may be any temperature described herein. With the structure contacting water, the method may be similar to method 100 and incorporate features of method 100. Similarly, method 100 may incorporate features of method 400.

In some embodiments, the structure at the location may be contacting seawater. For example, the structure at the location may be contacting the ocean. The ambient temperature of the water contacting the structure may be below 88° F. or may be any temperature described herein.

In some embodiments, the structure at the location may be contacting a refrigerated fluid. The refrigerated fluid may include any suitable refrigerant. In some embodiments, the refrigerated fluid may be air cooled to a temperature below 88° F. The refrigerated fluid may flow in a separate structure outside the structure or within the structure. The heat transfer between the refrigerated fluid and the structure results in the first gas mixture being cooled to a temperature below 88° F. or may be any temperature described herein. In some embodiments, methods exclude a refrigerated fluid or any non-natural means to cool the structure below the ambient temperature (e.g., chillers, cryogenic fluids).

The pressure at the location may be greater than 1,000 psi or any pressure described herein. The pressure and temperature at the location may be any temperature or pressure in the carbon dioxide phase diagram that results in liquid carbon dioxide, while keeping the other components of the gas mixture in gaseous phase.

At block 406, method 400 may include separating the liquid carbon dioxide from the other gases to form separated liquid carbon dioxide. Separating the liquid carbon dioxide may be the same or similar to any separation described herein, including with block 106 in method 100.

At block 408, method 400 may include sequestering the separated liquid carbon dioxide. The sequestration of liquid carbon dioxide may be the same or similar to that described herein, including with method 100. In some embodiments, the liquid carbon dioxide may be sequestered underground, where the ground is not under a body of water. Underground sequestration may include a terrestrial well drilled below 2,000 feet. As used herein, terrestrial may refer to land masses that are not covered by an ocean or features within such land masses. The terrestrial well may be at a depth of at least 2,000 to 2,300 feet, 2,300 to 2,500 feet, 2,500 to 2,700 feet, or 2,700 to 3,000 feet. The terrestrial well may have a temperature suitable to maintain carbon dioxide as a liquid. Liquid carbon dioxide may be removed from a knockout device and pumped into the terrestrial well. The pressure needed to flow liquid carbon dioxide may be partly supplied by the pressure for liquefying the carbon dioxide from the first mixture of gases.

Some embodiments may include a system for separating carbon dioxide from flue gases, where the system does not include a body of water for cooling the gas mixture. The system may include a first pipe configured to withstand a pressure of a first gas mixture at least 1,000 psi. The first pipe may be in fluid communication with a flue gas output of an industrial process. The first pipe is configured to maintain the temperature of the first gas mixture at below 88° F. The system may include a separation chamber in fluid communication with the first pipe. A port may be connected to the separation chamber. The port may be configured to discharge liquefied carbon dioxide separated from the first gas mixture out of the separation chamber. A compressor may be configured to pressurize the first gas mixture to at least 1,000 psi.

The first pipe may include substructures to increase heat transfer from inside the structure to outside the structure. The substructures may be any substructures described herein. The ambient temperature outside the pipe may be below 88° F. or any temperature described herein. In some embodiments, the system may include a chiller or other suitable device to cool the first pipe with a refrigerated fluid.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the pipe" includes reference to one or more pipe and equivalents thereof known to those skilled in the art, and so forth. The invention has now been described in detail for the purposes of clarity and understanding. However, it will be appreciated that certain changes and modifications may be practice within the scope of the appended claims.

All publications, patents, and patent applications cited herein are hereby incorporated by reference in their entirety for all purposes. None is admitted to be prior art.

What is claimed is:

1. A method of utilizing depths to separate carbon dioxide from a gas mixture, the method comprising:
   flowing a first mixture of gases from the surface of a body of water to a depth in the body of water, the first mixture comprising carbon dioxide and other gases, wherein the first mixture of gases is a product from combusting a hydrocarbon fuel and wherein the carbon dioxide is at least 3% by mass of the first mixture of gases;
   compressing the first mixture of gases to a pressure of at least 1,000 psi;
   liquefying the carbon dioxide to form liquid carbon dioxide at the depth in the body of water, wherein the liquid carbon dioxide is not carbon dioxide dissolved in water;
   separating the liquid carbon dioxide from the other gases in a separation chamber in the body of water;
   draining the liquid carbon dioxide from the separation chamber through a knockout;
   flowing, using a pump, the liquid carbon dioxide from the knockout through the body of water; and
   flowing a second mixture of the other gases upward to the surface of the body of water.

2. The method of claim 1, wherein the other gases comprise products from combusting the hydrocarbon fuel or molecular nitrogen.

3. The method of claim 1, wherein the pressure of the first mixture is at least 1,050 psi at the depth in the body of water.

4. The method of claim 3, wherein the pressure is a result of (1) compression of the first mixture at the surface and (2) the weight of the first mixture above the depth.

5. The method of claim 3, wherein the temperature of the first mixture at the depth in the body of water is less than 88° F.

6. The method of claim 1, wherein the pressure of the first mixture is at least 1,300 psi at the depth in the body of water.

7. The method of claim 1, further comprising contacting the liquid carbon dioxide with water in the body of water without dissolving the liquid carbon dioxide in the water.

8. The method of claim 1, further comprising releasing the second mixture into the atmosphere.

9. The method of claim 1, further comprising flowing carbon dioxide separated from the other gases to the surface of the body of water.

10. The method of claim 1, further comprising:
    flowing the carbon dioxide separated from the other gases to land, and
    geologically sequestering the liquid carbon dioxide.

11. The method of claim 1, wherein:
    the body of water is an ocean, and
    the depth is a first depth,
    the method further comprising:
    flowing, using the pump, the liquid carbon dioxide to a second depth to increase the density of the liquid carbon dioxide above the density of seawater at the second depth,
    releasing the liquid carbon dioxide into the seawater, and
    flowing the liquid carbon dioxide to the bottom of the ocean as a result of the density of the liquid carbon dioxide relative to the density of the seawater, thereby sequestering carbon dioxide.

12. The method of claim 11, wherein the second depth is at least 7,000 feet.

13. The method of claim 11, further comprising contacting the liquid carbon dioxide with seawater at the second depth to increase the density of the liquid carbon dioxide.

14. The method of claim 1, wherein:
the body of water is an ocean, and
the depth is a first depth,
the method further comprising:
flowing the liquid carbon dioxide to a second depth of at least 7,000 feet to increase the density of the liquid carbon dioxide above the density of seawater at the second depth, and
releasing the liquid carbon dioxide into sediments on the floor of the ocean or into sediments or rocks beneath the ocean floor, thereby sequestering carbon dioxide.

15. The method of claim 1, wherein the separating of the liquid carbon dioxide from the other gases does not comprise using an absorbent, adsorbent, or a membrane.

16. The method of claim 1, further comprising:
generating the first mixture of gases at a process plant, and
flowing the first mixture of gases from the process plant to the surface of the body of water through a pipe,
wherein flowing the first mixture of gases from the surface to the depth comprises flowing the first mixture of gases through the pipe.

17. A method of separating carbon dioxide from a gas mixture, the method comprising:
flowing a first mixture of gases through a structure, the first mixture comprising carbon dioxide, molecular nitrogen, and other gases, wherein:
the carbon dioxide and the other gases are products from combusting a hydrocarbon fuel,
the carbon dioxide is at least 3% by mass of the first mixture of gases, and
the structure is contacting water in a body of water;
compressing the first mixture of gases to a pressure of at least 1,000 psi;
liquefying the carbon dioxide at a location in the structure to form liquid carbon dioxide as a result of the ambient temperature outside the structure at the location and the pressure of the first mixture in the structure at the location, wherein the liquid carbon dioxide is not carbon dioxide dissolved in water;
separating the liquid carbon dioxide from the other gases to form separated liquid carbon dioxide in a separation chamber in the body of water;
draining the separated liquid carbon dioxide from the separation chamber through a knockout;
flowing, using a pump, the separated liquid carbon dioxide through the body of water; and
sequestering the separated liquid carbon dioxide.

18. The method of claim 17, wherein:
the structure comprises substructures to increase heat transfer from inside the structure to outside the structure.

19. The method of claim 17, wherein:
the body of water is a freshwater body of water; and
the ambient temperature is below 88° F.

20. The method of claim 17, wherein:
the structure at the location is contacting seawater; and
the ambient temperature is below 88° F.

21. The method of claim 17, wherein:
the structure at the location is contacting a refrigerated fluid, and
the temperature of the refrigerated fluid is below 88° F.

22. The method of claim 17, wherein the pressure is greater than 1,050 psi.

23. The method of claim 17, wherein the structure comprises a flexible or movable component to transfer pressure from the body of water at a first depth to the first mixture of gases.

* * * * *